Patented Dec. 11, 1951

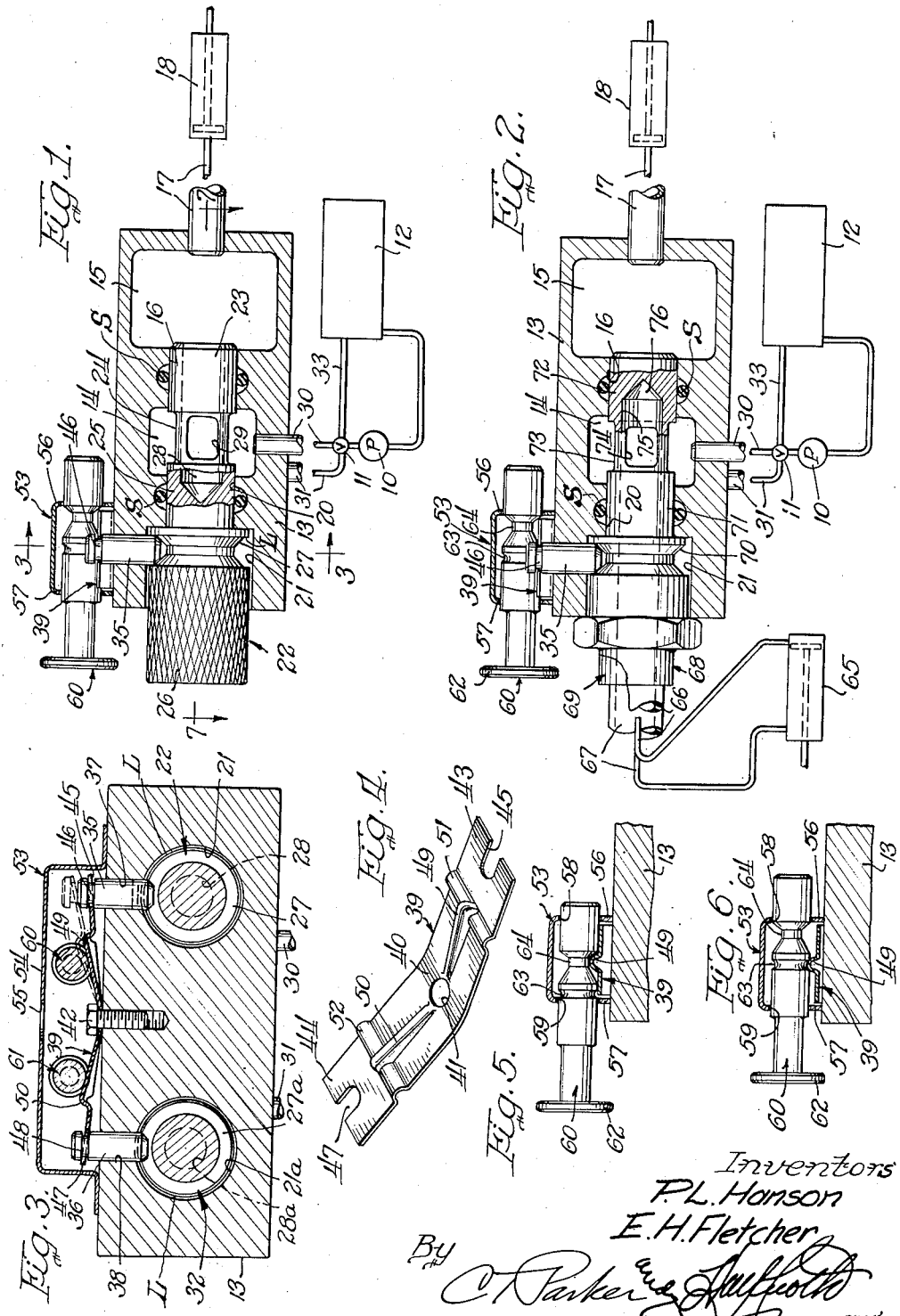

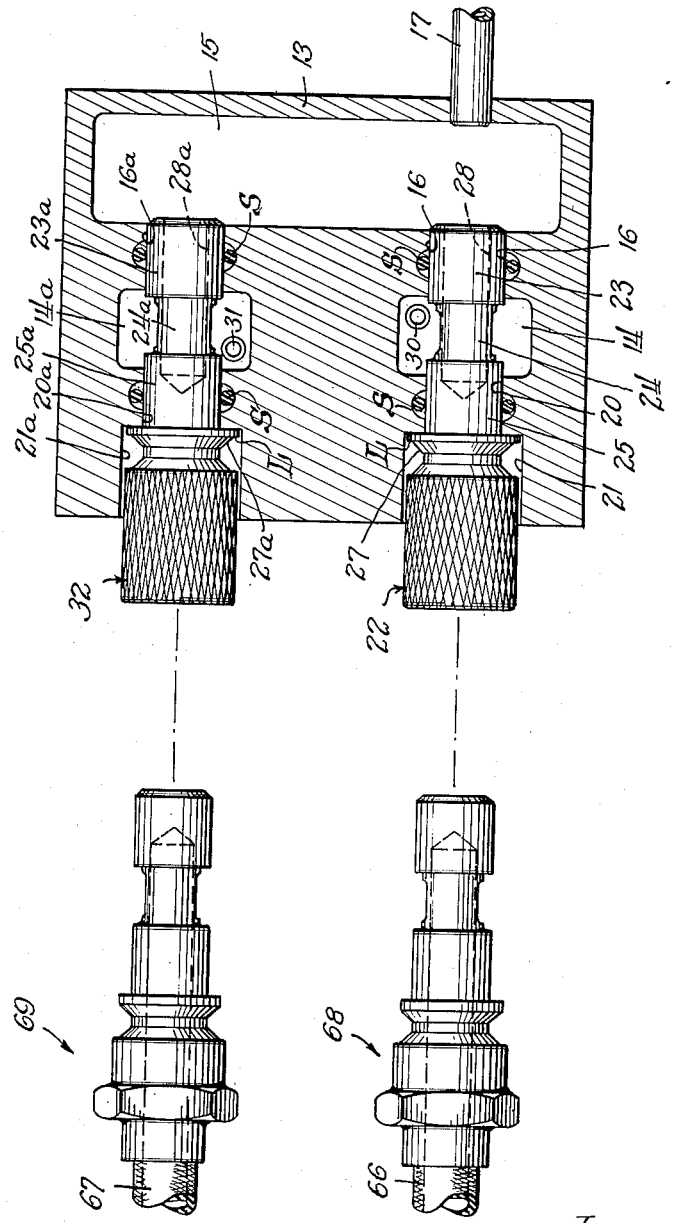

2,578,542

UNITED STATES PATENT OFFICE 2,578,542

FLUID LINE COUPLING FOR HYDRAULIC CONTROL SYSTEMS

Paul L. Hanson and Edward H. Fletcher, Waterloo, Iowa, assignors to Deere Manufacturing Co., Dubuque, Iowa, a corporation of Iowa Application February 27, 1948, Serial No. 11,504

15 Claims. (Cl. 285—96.3)

This invention relates to a hydraulic system and more particularly to an improved means for connecting or coupling a fluid line, such as a hose or like conduit, to the hydraulic circuit for transmitting fluid under pressure to a point remote from the source of fluid pressure.

Systems of the general type referred to are becoming increasingly applied to the control of agricultural implements operated in conjunction with tractors. In one known system, the tractor is equipped with a pump which supplies fluid under pressure to a distributing valve. This valve is controllable at the will of the operator to supply fluid under pressure to a first cylinder mounted on the tractor and commonly termed the integral cylinder. This cylinder is useful for the purpose of raising, lowering or otherwise adjusting implements carried by the tractor or closely coupled thereto. As an addition to such system, there is provided a remote cylinder, separate from the integral cylinder, for use with tractor-connected implements wherein the implement part to be adjusted is relatively remote from the operator's station on the tractor. In this case the remote cylinder is mounted on the implement and is connected by means of a hose or other suitable conduit to the distributing valve on the tractor, the valve being selectively operable to supply fluid under pressure to either of the cylinders.

It is desired in the use of a system of the type referred to above, that the remote cylinder be disconnectible from the distributing valve or main fluid pressure system, for at least two basic reasons: (1) It may be desirable to leave the remote cylinder on the implement when the implement is disconnected from the tractor; and (2) provision must be made for disconnection of the fluid line hoses in the event that the implement is of the type connected to the tractor by means providing for release of the implement from the tractor in response to an excessive force applied to the draft connection, as will occur when the implement strikes an obstruction in the field.

The problem of providing an adequate coupling for connecting the fluid line hose to the distributing valve is vexatious and affords many complications. The coupling must be capable of withstanding the high fluid pressure developed in the system without permitting leakage. At the same time, the coupling must be readily removable for the purpose of disconnecting the fluid line, whether this disconnection be accomplished deliberately or accidentally in response to release of the implement. Further, the coupling must be such that it may be removed and replaced with a plug without a material loss of fluid. Still further, the disconnectibility of the coupling must be such as to encourage proper use of the system by the operator and must be free from troublesome adjustments and maintenance requirements.

The present invention contemplates and has for its principal object the provision of an improved coupling means that eliminates the foregoing problems and achieves the status of simplicity of construction and efficiency in use, in that it is of integral construction and does not employ separable parts likely to become lost or misplaced. In this respect, reference is had to one known prior construction in which the coupling was connected to the distribuing valve by means of frangible shear washers subject to breakage in response to excessive forces applied to the fluid line hoses, it being necessary to replace such washers after such disconnection had been made; or, in the event that the disconnection was made deliberately, it was necessary to exercise reasonable care so that the washers would not be lost and could be reused. In this respect, it is an important object of the invention to provide for the temporary retention of the coupling in connecting position with respect to the distributing valve by employing fluid pressure for the purpose in such manner that the fluid pressure tends to balance the coupling against disconnection or separation from the distributing valve, in contradistinction to a known construction in which fluid pressure applied to the fluid line was cumulative against the coupling and required shear washers of additional strength to withstand the tendency of the coupling to slip out.

The known structure over which the present invention provides an improvement is disclosed and claimed in assignee's co-pending application, Serial No. 626,626, filed November 5, 1945, now Patent No. 2,532,552.

Inasmuch as the preferred construction of the present invention involves the use of fluid pressure to assist in retaining the coupling in place, it is permissible to use a relatively lightly loaded detent means in conjunction with the coupling. Accordingly, it is another feature of the invention to provide an improved an simplified detent means employing spring means normally tensioned to withdraw the detent from locking position so that the coupling may be manually removed from the distributing valve and including means for relieving this tension on the spring means and applying tension on the spring means in a direction tending to urge the detent in locking position. Specifically, it is an object of the invention in this respect to provide manually controllable means conveniently accessible to and operable by the operator so that disconnections and connections of the coupling may be speedily effected.

The foregoing and other important objects and desirable features inherent in and encompassed by the invention will become apparent to those skilled in the art as the disclosure is more fully made of a preferred form of the invention in the following detailed description and accompanying sheet of drawings, wherein:

Figure 1 is a diagrammatic illustration, partly in section, showing one form of hydraulic circuit in which the invention may be used, the view showing a removable plug in place in the circuit so that fluid pressure is applied to the integral cylinder;

Figure 2 is a similar illustration, showing the system as changed over for use in supplying fluid under pressure to a remote cylinder, the plug having been removed and replaced by fluid line couplings;

Figure 3 is a transverse sectional view taken substantially on the line 3—3 of Figure 1 showing the improved detent means in conjunction with a pair of fluid line plugs;

Figure 4 is a perspective view of the preferred type of spring means employed in conjunction with the detent;

Figure 5 is a fragmentary sectional view showing an operating member in one position for controlling the detent spring;

Figure 6 is a view similar to that in Figure 5 but showing the operating member in its second position with respect to the detent spring; and Figure 7 is a plan sectional view of the casing and plugs as viewed generally along the line 7—7 of Figure 1, together with illustration of the coupling members that replace the plugs.

The system chosen here for the purposes of illustrating and describing the invention is one that is commonly used and one with which we are thoroughly familiar and, further, one which we have improved by the incorporation therein of means constructed according to the principles of the present invention. It will be appreciated that the improved means may be adapted to other systems. It will also be appreciated that the detailed structure of the preferred form of the invention does not establish the limits of the invention or modifications or alterations thereof. The present disclosure should, therefore, be taken only as illustrative and not restrictive.

In the drawings, the numerals 10, 11 and 12 designate respectively a fluid pump, a distributing valve, and a fluid reservoir forming part of a hydraulic system of the type referred to above. The system may further include a casing 13 which may be either integral with or remote from the valve 11 but in any event connected thereto by suitable fluid passages. The casing is provided with walled portions establishing a first chamber 14 and a second chamber 15 interconnected by a passage or bore 16. The chamber 14 is separated from a companion chamber 14a (Figure 7) for use in exhausting a fluid motor or cylinder and piston unit 18 and for use also with a remote two-way cylinder to be hereinafter described. The chamber 15 opens through a wall of the casing 13 by means of a fluid line or conduit 17 for communicating the chamber 15 with one end of the motor 18.

Assuming that the hydraulic system illustrated is used with an agricultural tractor for the purpose of controlling implements connected thereto or mounted thereon, the motor 18 represents the integral cylinder on the tractor.

The casing 13 is provided with a passage or bore 20, here shown as being coaxial with the bore 16 and extending rearwardly or outwardly from the chamber 14 and opening into a counterbore 21. The bores 16 and 20 and the counterbore 21 are shown as being occupied by a removable plug designated generally by the numeral 22. This plug has preferably an inner cylindrical portion 23 which fits the bore 16; an intermediate reduced portion 24 which is surrounded by the chamber 14; a second cylindrical portion 25 which fits the bore 20; and a knurled handle portion 26 by means of which the plug may be easily connected to and removed from the casing 13. The handle portion is extended inwardly toward the cylindrical portion 25 and is provided with an annular groove 27, for a purpose to be later described.

A fluid passage in the form of a bore 28 extends axially from the inner end portion 23 of the plug to a point within the portion 25 of the plug, terminating in the latter portion. The intermediate portion 24 of the plug is apertured or otherwise provided with an opening 29 formed by cutting out a wall portion of the intermediate portion 24 so that the opening intersects and is in communication with the chamber 14. The chamber 14 is further in communication via a fluid line or conduit 30 with one side of the valve 11.

From the description thus far it will be seen that a hydraulic circuit is established from the reservoir 12, through the pump 10, and through the valve 11 and conduit 30 to the chamber 14; thence through the opening 29, and bore 28 to the chamber 15; and thence through the fluid line 17 to the integral cylinder 18.

The chamber 14a is connected to the valve 11 by means of a fluid line or conduit 31 which, when the piston in the motor 18 is moving from right to left, provides for return of fluid through the valve 11 to the reservoir by means of a conduit 33. The casing is further provided with another series of bores 16a, 20a and a counterbore 21a (Figure 7) similar to those described at 16, 20 and 21 for the purpose of accommodating a second plug, which includes portions 23a, 24a and 25a corresponding to the portions 23, 24 and 25 of the plug 22. The bores 16, 16a, 20 and 20a are suitably sealed at S against leakage. The second counterbore also appears in Figure 3; and the plug 32 is provided with an annular groove 27a comparable to the annular groove 27 in the plug 22.

In the use of the system in conjunction with the integral cylinder 18, the only parts played by the plugs 22 and 32 are: First, to close off the passages 29 and 29a to the exterior of the casing; and second, to establish fluid pressure communication between the chambers 14, 14a and 15. With respect to the relationship between the chambers 14, 14a, and 15, attention should be called to the fact that the present disclosure is merely a diagrammatic illustration of the invention as adapted by means of modifying an existing system as disclosed in the co-pending application referred to above and that the present system does not necessarily require the three chambers 14, 14a, and 15 associated in the manner illustrated. For the present purposes, the function of the chamber 15 may be disregarded except in so far as it provides means whereby fluid may flow from the chamber 14 to the fluid line or conduit 17 or back from the conduit 17 to the chamber 14a and thence to the reservoir through line 31, valve 11 and the line 33.

For the purpose of retaining the plugs 22 and 32 in place, provision has been made for simplified detent means. This means is here shown as first and second detent members or plungers 35 and 36 for the plugs 22 and 32, respectively (Figures 1 and 3). The casing is provided with a pair of vertical bores 37 and 38 for the plungers 35 and 36, so that each plunger is mounted for movement back and forth along a path at an angle (here a right angle) to the axis of the respective plug; this path is also normal to the path of removal and insertion of the plug. The plungers 35 and 36 in depressed position respectively engage the annular grooves 27 and 27a in the plugs 22 and 32. The annular groove of each plug is bordered at its front edge or rim by an annular shoulder or ledge L so that the plugs cannot be forced past the plunger by hydraulic pressure.

According to the present invention, a novel form of spring means is provided for controlling the action of the detent plungers. This spring is best shown in Figure 4 and is designated by the numeral 39. The spring comprises a central body portion 40 apertured at 41 to receive means in the form of a cap screw 42 (Figure 3) for securing or anchoring the spring 39 to the casing 13. The location of the anchoring point of the spring 39 is midway between the detent plungers 35 and 36; or in other words, at a point spaced from each detent plunger. The spring further includes two laterally outwardly extending portions 43 and 44, the former of which is slotted at 45 to engage a groove 46 in the plunger 35 and the latter of which is slotted at 47 to engage a similar groove 48 in the plunger 36. The spring portions 43 and 44 are normally tensioned to hold the plungers 35 and 36 in releasing or withdrawn position, this position of the plunger 35 being shown in broken lines in Figure 3. The spring body is ribbed along its longitudinal or principal axis to provide a pair of rib-like upstanding elements 49 and 50. The rib 49 terminates at its outer portion in a rib 51 transverse thereto and the rib 50 is similarly related to a rib 52.

The casing 13 carries thereon supporting structure including a housing or bracket 53 preferably formed of light gauge sheet metal. This bracket includes a transverse upper portion 54 apertured at 55 to provide access to the cap screw 42. The housing further includes front and rear wall portions 56 and 57. These wall portions are apertured in alignment at one side of the center line between the plugs 22 and 32, as at 58 and 59 (Figures 5 and 6). These openings or apertures provide bearings which serve to carry slidably in the housing 53 a longitudinally movable operating member 60, which provides means for controlling the spring portion 43. The walls 56 and 57 are similarly apertured at the other side of the center line of the assembly and serve as bearings for carrying a second operating member 61 (Figure 3), which controls the spring portion 44.

The operating members 60 and 61 are identical, and a description of one will suffice for the other. Each member includes a handle portion 62 and the main body of the member is preferably cylindrical and provided with a first annular groove or recess 63 and a second annular groove or recess 64. The diameters of the portions providing the grooves 63 and 64 are different, so that the groove 63 serves, in effect, as a "high" portion and the groove 64 provides a "low" portion as respects the rib 49 (50) on the spring 39. Each member 60 (61) is mounted for longitudinal sliding movement in the housing 53; the grooves or portions 63 and 64 may be selectively positioned with respect to the rib 49 (50) on the spring, accordingly controlling the tensioning of the spring in a manner to be presently described.

When the operating member 60 is withdrawn from the position shown in Figure 5, the low portion provided by the groove 64 receives the rib 49 on the spring portion 43, with the result that the natural tension of the spring keeps the spring portion in its upper position, as shown in broken lines in Figure 3. In this position of the parts, the detent plunger 35 is withdrawn from the annular groove 27 in the plug 22 and permits the operator to readily withdraw the plug from the casing. When the operating member 60 is moved inwardly, the rib 49 is engaged by the high portion provided by the groove or recess 63, thus depressing the spring portion 49 and simultaneously depressing the detent plunger 35 into the annular groove 27 and behind the annular ledge L of the plug 22. This action of the operating member relieves the upward tension on the spring 49 and tensions the spring in the opposite direction so that it yieldably resists upward movement of the plunger 35. This result is achieved because the spring portion 49 is sufficiently long and the operating member 60 is associated with the spring portion at a point thereon intermediate its outer ends and the anchor point at the cap screw 42. Similar results and operations are attendant upon the use of the other operating member 61 with respect to the other plug 32.

The most important use of the improved detent means is in connection with the hydraulic circuit when employed with a remote cylinder, as set forth above. Such circuit is shown in Figure 2, wherein the numeral 65 designates a hydraulic motor in the form of a two-way cylinder and piston assembly connected at opposite ends respectively to fluid lines or conduits 66 and 67. In the use of this system with an agricultural unit of the type referred to before, the conduits 66 and 67 will ordinarily be hoses or other flexible conduits. These hoses are connected to the casing 13 by means of coupling members 68 and 69, respectively. Since the two couplings are identical, reference will be had to only the coupling 68 for a detailed description and illustration thereof. The coupling 69 appears in Figure 7.

This coupling includes a body, preferably cylindrical, and having an enlarged portion which fits the counterbore 21 in the casing 13. This portion is further formed with an annular groove 70 similar to the annular groove 27 in the plug 22, except that the coupling does not have an annular shoulder or ledge like that at L on the plugs, since, as will appear below, it is desirable as a safety measure that the coupling can be released. In this respect it should be noted that the plug 22 is removed and replaced by the coupling member 68. The coupling member further includes a cylindrical portion 71 integral with and just inside the cylindrical portion in which the groove 70 is formed, the portion 71 corresponding to the portion 25 of the plug 22. This portion of the coupling body extends inwardly past the chamber 14 and includes a second cylindrical portion 72 preferably of the same diameter as the portion 71 and corresponding generally to the portion 23 of the plug 22. That portion of the coupling body that intersects or is surrounded by the chamber 14 is somewhat reduced in diameter, as at 73, and is provided with an opening 74 which communicates the chamber 14 with an axial passage in the form of a bore 75 in the coupling 68. This bore at the outer end of the coupling body 68 is in fluid communication with the fluid line or hose 66, and at its other end terminates in a blind recess 76 in the coupling portion 72, this blind recess preferably being achieved by the drilling of the coupling body to provide the passage or bore 75, the end or center of the drill providing the recess 76.

The other coupling 69 is similarly constructed and is associated with the chamber 14a by means of an opening corresponding to the opening 74.

The couplings 68 and 69 are retained in the casing 13 by means of the detent plungers 35 and 36, the operation of each of which in engaging the annular groove 70 in the coupling 68 and a similar grove in the coupling 69 following the operation and effect of the plunger in connection with the plugs 22 and 32, as described above.

In the use of the hydraulic system with the remote cylinder 65, the integral cylinder 18 is cut out of the circuit, this being accomplished by the portion 72 of the coupling 68 (and a similar portion on the coupling 69), which cuts off communication between the chambers 14 (14a) and 15. The chamber 14 is still open to the fluid line 30 from the valve 11 and fluid supplied by the pump 10 is distributed through the valve 11 and the line 30 to the chamber 14; the fluid flows thence through the opening 74, through the bore 75 in the coupling 68 and through the fluid line or hose 66 to one end of the remote cylinder 65. Fluid exhausted from the cylinder 65 at the other end thereof returns through the hose or conduit 67 and through the coupling 69 to the chamber 14a and thence through the external conduit or line 31 and through the valve 11 and the conduit or line 33 to the reservoir 12. It will be understood, of course, that the valve 11 is constructed and arranged in the circuit for the purpose of reversing the flow of fluid so that fluid under pressure may be delivered through the line 31 and chamber 14a to the coupling 69 and hose 67 to the other end of the cylinder 65 for the purpose of moving the piston therein in the opposite direction, exhaust of fluid in this case being through the hose or line 66 and coupling body 68 to the chamber 14 and thence through the line 30, valve 11 and line 33 to the reservoir 12. In this respect attention is again directed to the fact that the illustration of the hydraulic circuit is merely diagrammatic and that the representation of the parts therein is made on the basis that those skilled in the art will be able to substitute their own components in similar circuits.

The operation of the detent members 35 and 36 in connection with the removal and insertion of the plugs 22 and 32 has been set forth above. The following will cover generally the entire operation of the system in connection with both the integral cylinder 18 and the remote cylinder 65, together with the functioning of the detent means in securing the couplings 68 and 69 in the casing 13.

As previously stated, the system is such that either the integral cylinder 18 or remote cylinder 65 can be used; but not both at the same time. When it is desired to employ the system in connection with the operation of the integral cylinder 18, the plugs 22 and 32 are inserted in the casing 13, the manner of insertion being illustrated in Figure 1 with respect to the plug 22. The plugs 22 and 32 respectively close or cut out the passages or bores 20 and 20a in the casing 13 and fluid cannot flow rearwardly therein, being directed through the opening 29 and bore 28 in the plug to the chamber 15 and thence through the line 17 to the integral cylinder 18. Displacement of the plugs 22 and 32 by fluid pressure in the chamber 14 is resisted by the detents 35 and 36, the operating members 60 and 61 being in the position represented by the position of the member 60 in Figure 6, so that the tension on the spring 39 is downwardly to hold the plungers 35 and 36 in the annular grooves 27 and 27a of the plugs 22 and 32, respectively.

When it is desired to change the system over for use with the remote cylinder 65, the pump 10 is first shut down, the piston in the integral cylinder 18 being ordinarily moved to the position shown in Figure 1; although, the position of this piston will not affect the operation of the system with the remote cylinder 65.

Next, the operating members 60 and 61 are moved rearwardly to the position represented by the position of the member 60 in Figure 5, so that downward pressure of the spring 39 on the plungers 35 and 36 is relieved and the effect of the spring is restored to normal; that is, so that the tension thereon tends to move the plungers 35 and 36 upwardly and out of the grooves 27 and 27a in the plugs 22 and 32, respectively. The operator may now easily withdraw the plugs 22 and 32 and may insert the couplings 68 and 69 in lieu thereof, so that the fluid lines or hoses 66 and 67 are connected to the source of fluid under pressure. Assuming that the piston in the remote cylinder 65 is in the position shown in Figure 2, the valve 11 is positioned so that fluid is supplied through the line 30 to the chamber 14 and thence through the coupling 68 to the hose or line 66, it being understood that the chamber 14 is separate from the chamber 14a so that fluid cannot flow through the coupling 69 to the opposite end of the cylinder 65. Fluid will return from the opposite end of the cylinder 65 through the line 67 and coupling 69 to the chamber 14a and thence through the line 31, valve 11, and line 33 to the reservoir 12.

The couplings 68 and 69 are releasably locked in place in the casing 13 by means of the detent members 35 and 36, the operating members 60 and 61 having been moved inwardly to the position represented by the position of the member 60 in Figure 6 so that tension on the spring 39 is downwardly against the detent plungers. The tendency of the couplings 68 and 69 to be displaced from the casing 13 is considerably greater than that with respect to the plugs 22 and 32. One reason for this is that the couplings and lines are subjected to considerable line pressure. In addition to this, there is the weight of the hoses 66 and 67 to be taken into consideration. Further, the implement is ordinarily connected to the tractor drawbar for movement with respect to the tractor, so that the hoses 66 and 67, being flexible, tend to surge back and forth and tend to tug at the couplings 68 and 69.

As stated above, couplings of the general type referred to were held in place in one particular construction by means of frangible shear washers. It was necessary that these washers be made of sufficient strength to resist the ordinary tendency of the plugs to be displaced by the combination of fluid pressure, weight of the hoses, and natural tendency of the hoses to tug at the coupling. It was found in many cases that the strength of the shear washers was so great, in order to meet the ordinary requirements, that the washers would not shear properly in the event that the implement became disconnected from the tractor in response to an excessive draft force thereon, with the result that the hoses were likely to become damaged at points thereon intermediate the coupling and the cylinder to which connected. In other instances, where the shear washers were replaced with spring loaded detent means, the detent means were of such strength to meet the ordinary requirements as to fail to function properly in the event of such overload release of the implement from the tractor, also resulting in damage to the hoses.

According to the present invention, the tendency of the couplings to become displaced is minimized by the employment of a balancing proportion of fluid pressure on the interior portion of the couplings. This result is accomplished in the preferred illustration set forth herein by means of the application of fluid pressure to the blind recess 76 in the coupling 68 and a similar blind recess in the coupling 69. The pressure-receiving area of the wall portions defining the recess 76 is opposed to the direction of movement of the coupling out of the casing 13. In accordance with the proportion of the parts as shown in the drawings, line pressure within the system that is exerted on the remote cylinder couplings 68 and 69 is reduced to zero. Consequently, the detent plungers 35 and 36 need be strong enough only to retain the couplings in the casing against their tendency to become displaced by forces other than line pressure directed against the couplings, among which forces, as set forth above, are the the weight of the hoses, and the tendency of the hoses to tug at the couplings.

It will be seen from the foregoing that there has been provided an improved and simplified connection between fluid line couplings and a casing to which the couplings are connected. This means function satisfactorily to meet all requirements known to exist in the use of a hydraulic system of this type for the control of agricultural implements or the like and embodies provision for both automatic and deliberate release of the couplings from the casing; the means also, of course, provides for the manual release of the plugs 22 and 32 when it is desired to install the couplings 68 and 69. The simplicity of the construction and operation of the spring 39 and detent plungers 35 and 36 is of extreme importance in reducing the cost of the structure and in the provision of an arrangement that will work efficiently without involving complicated routine. Other features and advantages of the invention will undoubtedly occur to those skilled in the art and the preferred form of the invention disclosed will obviously suggest numerous modifications and alterations thereof, all of which may be made without departing from the spirit and scope of the invention as defined in the appended claims.

We claim:
1. In a device of the class described including a pair of normally connected parts arranged for separation by movement of one part in a direction away from the other, the improvement residing in controllable detent means normally operable to hold the parts against separation except in the event of the application to one part of a separating force and releasable to provide for separation of the parts by force less than a separating force, said detent means comprising: a detent for one part; means providing a detent-receiving pocket in the other part; means carrying the detent on said one part for movement back and forth into and out of the pocket along a path at an angle to the direction of separation of the parts; spring means carried by one part and engaging the detent; and an operating member carried by one part for movement back and forth thereon between first and second positions and engageable in one position thereof with the spring means to tension the latter in one direction to urge the detent into the pocket, and in its other position disengageable from the spring means to relieve the aforesaid tension thereon to provide for return of the detent out of the pocket.

2. In a device of the class described including a pair of normally connected parts arranged for separation by movement of one part in a direction away from the other, the improvement residing in controllable detent means normally operable to hold the parts against separation except in the event of the application to one part of a separating force and releasable to provide for separation of the parts by force less than a separating force, said detent means comprising: a detent for one part; means providing a detent-receiving pocket in the other part; means carrying the detent on said one part for movement in opposite directions into and out of the pocket along a path at an angle to the direction of separation of the parts; spring means carried by one part and engaging the detent and normally tensioned in one direction to urge the detent in one direction; and an operating member carried by one part and movable thereon back and forth between first and second positions and engageable in its first position with the spring means to overcome the aforesaid tension on the spring means to tension the spring means in the opposite direction to urge the detent in the other direction, said member in its second position reestablishing the normal effect of the spring means as aforesaid.

3. The invention defined in claim 2, further characterized in that: the spring means comprises a flat spring having one portion thereof anchored at a point on one part spaced from the detent, and having another portion extending toward and engaging the detent; and the operating member engages with and disengages from a portion of said flat spring intermediate the anchored portion thereof and the detent-engaging portion thereof.

4. The invention defined in claim 3, further characterized in that: the operating member comprises a plunger-like element having two portions thereon, one of which is a high portion engageable with the spring in the first position of the control member and the other of which is a low portion cooperable as aforesaid with the spring in the second position of the member.

5. The invention defined in claim 4, further characterized in that: the spring is provided with a raised rib-like element selectively and releasably engageable with the operating member portions to hold the operating member in one or the other of its positions.

6. The invention defined in claim 5, further characterized in that: each operating member portion is recessed to receive the element on the spring.

7. In a hydraulic control system of the type comprising a housing having wall portions providing a chamber to which fluid is supplied under pressure and further having a bore communicating with the chamber and opening through a wall portion for communication with a fluid line that carries fluid under pressure to a point remote from the chamber, which line is subject to the application of external tensional forces tending to separate the line from the housing, the improvement comprising: a coupling for connecting the line to the chamber and including a coupling body fixed to the fluid line and releasably supported by the housing, said body having a cylindrical portion slidably fitting the bore for axial separation thereof from the housing in a direction away from the housing in response to the application to the line of such tensional forces and reconnectible to the housing by insertion of the cylindrical portion into the bore; means providing an axial bore in the coupling body in communication with the fluid line; means providing an opening in the body communicating the body bore and the chamber; means in the body in communication with the chamber and providing a fluid-pressure-receiving area opposed to the direction of separation of the coupling body from the housing; and yielding means cooperable between the housing and the coupling body and normally effective to retain the coupling body connected to the housing except in response to excessive tensional forces applied to the fluid line or coupling in a direction tending to separate the coupling from the housing.

8. The invention defined in claim 7, further characterized in that: the yielding means includes a selectively operable device for relieving the effect of said yielding means on the coupling body to provide for separation of the coupling body from the housing upon the application of force of less magnitude than that required to separate the coupling body as aforesaid.

9. The invention defined in claim 7, further characterized in that: the yielding means comprises a detent carried by the housing and movable back and forth in a path at an angle to the direction of separation of the coupling body, means forming a recess in the coupling to receive the detent, and a variable-tension spring means engaging the detent and effective to urge same into said recess.

10. The invention defined in claim 9, further characterized in that: the variable-tension spring means includes a spring body tensioned to urge the detent out of the recess, and a movable control member having two control portions thereon selectively engageable with the spring body to change the tension of the spring so that the effect thereof is to urge the detent into the recess.

11. The invention defined in claim 10, further characterized in that: the control member is slidably carried by the housing for movement back and forth along a path generally normal to the line of force applied by the spring to the detent, and the two control portions project from the control member at different distances in the direction of application of force by the spring to the detent so that one control portion tensions the spring to a greater extent than does the other.

12. In a hydraulic control system of the type comprising a casing having wall portions providing an inlet passage through which fluid is supplied under pressure to the interior of the casing and further having an outlet passage communicating with the inlet passage and opening through a wall portion for communication with a fluid line that carries fluid under pressure to a point remote from the inlet passage, which line is subject to the application of external tensional forces tending to separate the line from the casing, the improvement comprising: a coupling for connecting the line to the outlet passage and including a coupling body fixed to the fluid line and releasably supported by the casing, said body having a portion slidably fitting the outlet passage for separation thereof from the casing in a direction away from the casing in response to the application of such tensional forces and reconnectible to the casing by insertion of the body into the outlet passage; means providing a passage in the coupling body in communication with the fluid line; means providing an opening in the body communicating the body passage and the inlet passage; means in the body in communication with the inlet passage and providing a fluid-pressure-receiving area opposed to the direction of separation of the coupling body from the casing; and yielding means cooperable between the casing and the coupling body and normally effective to retain the coupling body connected to the casing except in response to excessive tensional forces applied to the fluid line or coupling in a direction tending to separate the coupling from the casing.

13. In a hydraulic control system of the type comprising a casing having wall portions providing an inlet passage through which fluid is supplied under pressure to the interior of the casing and further having an outlet passage communicating with the inlet passage and opening through a wall portion for communication with a fluid line that carries fluid under pressure to a point remote from the inlet passage, which line is subject to the application of outwardly acting forces developed by fluid pressure that tend to separate the line from the casing, the improvement comprising: a coupling for connecting the line to the outlet passage and including a coupling body fixed to the fluid line and releasably supported by the casing, said body having a portion slidably fitting the outlet passage for separation thereof from the casing in a direction away from the casing; means providing a passage in the coupling body in communication with the fluid line; means providing an opening in the body communicating with the fluid line; means providing an opening in the body communicating the body passage and the inlet passage; and means in the body in communication with the inlet passage and providing a fluid-pressure-receiving area opposed to the direction of separation of the coupling body from the casing and serving to balance the coupling against the forces of fluid pressure acting in said direction of separation.

14. In a hydraulic control system of the type including a casing having walls providing a chamber to which fluid is supplied under pressure and further having an outlet passage in communication with the chamber and opening through a wall of the casing to supply fluid under pressure to an external fluid line that extends outwardly away from the casing and that carries fluid under pressure to a point remote from the casing, which line is subject to the application of outwardly acting forces developed by fluid pressure that tend to separate the line from the casing, the improvement comprising: a coupling for connecting the fluid line to the casing, including a coupling body fixed to the fluid line and releasably supported by the casing, said body slidably fitting the outlet passage in the casing for separation from the casing outwardly therefrom or in the direction of extent of the fluid; means providing a fluid passage in the coupling body in communication at its outer end with the fluid line and terminating at its inner end as a blind recess; and means providing an opening in the coupling body intermediate the outer end and the blind end of the body passage and communicating the body passage with the chamber so that fluid pressure applied to the chamber will be carried through the body passage to the fluid line and a balancing portion of fluid pressure from the chamber will be applied to the blind recess in a direction opposed to the direction of withdrawal of the coupling body from the casing.

15. In a hydraulic control system of the type including a casing provided with a fluid passage for transmitting fluid under pressure to a fluid line extending outwardly away from the casing, which line is subject to the application of outwardly acting forces developed by fluid pressure that tend to separate the line from the casing, the improvement comprising: a coupling for connecting the fluid line to the casing, including a body having a portion fixed to the fluid line and a portion slidably carried by the casing for removal from the casing in a direction outwardly away from the casing; means in the body providing a fluid passage establishing fluid-pressure communication between the fluid passage of the casing and the fluid line to carry fluid pressure outwardly away from the casing; and means in the body exposed to fluid pressure and presenting a fluid-pressure-receiving area opposed to the direction of removal of the coupling body from the casing and serving to balance the coupling against the forces of fluid pressure acting in said direction of removal.

PAUL L. HANSON.
EDWARD H. FLETCHER.

REFERENCES CITED

The following references are of record in the file of this patent:

UNITED STATES PATENTS

| Number | Name | Date |
|---|---|---|
| 136,397 | Westinghouse | Mar. 4, 1873 |
| 1,534,173 | Vogelberg | Apr. 21, 1925 |
| 2,210,088 | Longfield | Aug. 6, 1940 |
| 2,318,965 | Parker | May 11, 1943 |